INVENTOR.
LEONARD S. KAHN

April 13, 1965 L. S. KAHN 3,178,663
SINGLE SPEED AND MULTISPEED UNITARY SYNCHRO STRUCTURE
Filed June 26, 1961 4 Sheets-Sheet 3

INVENTOR.
LEONARD S. KAHN
BY
ATTORNEY

United States Patent Office 3,178,663
Patented Apr. 13, 1965

3,178,663
SINGLE SPEED AND MULTISPEED UNITARY
SYNCHRO STRUCTURE
Leonard S. Kahn, River Vale, N.J., assignor to The Bendix
Corporation, Teterboro, N.J., a corporation of Delaware
Filed June 26, 1961, Ser. No. 119,601
11 Claims. (Cl. 336—120)

The invention relates to data transmission systems and more particularly to data transmission systems in which high accuracies are required.

Synchros are frequently used in data transmission systems as transmitters and control transformers and the need for accurate synchros having a maximum overall data transmission error of less than one minute over an operating range of three hundred and sixty degrees has been recognized, particularly for use in missiles and outerspace rockets. The quest for such accuracies has been the subject of intensive programs. It is desirable that such synchros be produced with available production tools and that the yield and cost of acceptable units be predictable and not dependent on questionable secondary machining operations based on preliminary test results.

The synchros must have the ability to maintain specified accuracy during mechanical and thermal stresses induced by clamping, reasonable handling and environmental conditions encountered under missile and outerspace rocket operating conditions. The sensitivity-to-noise ratio should be such that the transmitter provides signals substantially free of harmonics and quadrature voltages for positioning the control transformer within the specified accuracy without the use of extensive auxiliary equipment for harmonic elimination and quadrature rejection.

Since it was practically impossible heretofore to manufacture synchros with the high accuracies required, more sophisticated arrangements used a mechanical two-speed system wherein two conventional two-pole transmitting synchros were geared together so that, when one transmitting synchro made one revolution and produced a single-sine wave output, the other transmitting synchro made $n$ revolutions and produced $n$ sine waves. The synchro producing the single-sine wave was referred to as the coarse transmitter and the synchro producing $n$ sine waves was referred to as the fine transmitter. A similar control transformer arrangement was connected back-to-back to the transmitters. The coarse transmitter and control transformer avoided positional ambiguity.

This approach is unacceptable because of back-lash and other inherent gearing errors. Also, two-pole synchros are sensitive to changes in ambient temperature and essentially produce a point flux which rotates with the rotor. The point flux senses point-to-point changes in the magnetic path which is reflected in small variations in the direction of the flux path, thus resulting in errors.

One object of applicant's invention is to overcome the inherent disadvantages of the mechanical two-speed data transmission system as used heretofore by providing an electrical two-speed system.

Another object is to provide a two-speed data transmission system with an accuracy within thirty seconds of arc under dimensional stresses and wide temperature ranges.

Another object is to provide electrical synchro means which produce both a single-sine wave and a multi-sine wave output when rotated 360°.

Another object is to provide electrical two-speed synchro means which includes a two-pole synchro and a multi-pole synchro having $n/2$ poles were $n$ is a multiple of 4 greater than 4.

Another object is to provide a single synchro with two-pole and multi-pole windings on common rotor and stator structures.

The invention contemplates a two-speed synchro having relatively movable, inductively coupled rotor and stator elements with one of the elements having windings distributed to provide a two-pole alternating magnetic flux and a multi-pole alternating magnetic flux of alternately opposite phase and with the other element having windings distributed to provide a single-cycle output and a multi-cycle output upon relative rotation of the elements through a predetermined angle.

The multi-pole section of the two-speed synchro has maximum flux produced many times around the circumference of the magnetic structure, and its secondary winding is specifically designed to average each of the maximum fluxes. Consequently, in the multi-pole section of the two-speed synchro, although there are point-to-point changes because of manufacturing tolerances, mounting stresses, and differential expansion of parts with changes in ambient temperature, the average remains unchanged.

The effectiveness of the averaging characteristic is indicated in the difference of magnitude of error between a conventional two-pole synchro and a two-speed synchro embodying the present invention, both manufactured to the same tolerances. The same tolerances that permit a maximum error of minutes in a conventional two-pole synchro, result in a maximum error of only seconds in the novel two-speed synchro. Pressure on the housing in the sensitive area of the common lamination stack of a novel two-speed synchro, sufficient to cause thirty minutes of error in the conventional two-pole synchro, produces no error in the two-speed synchro.

The invention also contemplates a data transmission system comprising a pair of electrical two-speed synchros of the kind described above and connected back-to-back with one of the synchros being responsive to a condition. A switching network is connected to the other synchro and provides the single-cycle voltage at its output when the single-cycle volatge is above a predetermined amplitude and thereafter provides the multi-cycle voltage at its output.

The foregoing and other objects and advantages of the invention will appear more fully hereinafter from a consideration of the detailed description which follows, taken together with the accompanying drawings where two embodiments of the invention are illustrated by way of example. It is to be expressly understood, however, that the drawings are for illustration purposes only and are not to be construed as defining the limits of the invention.

Figure 1:
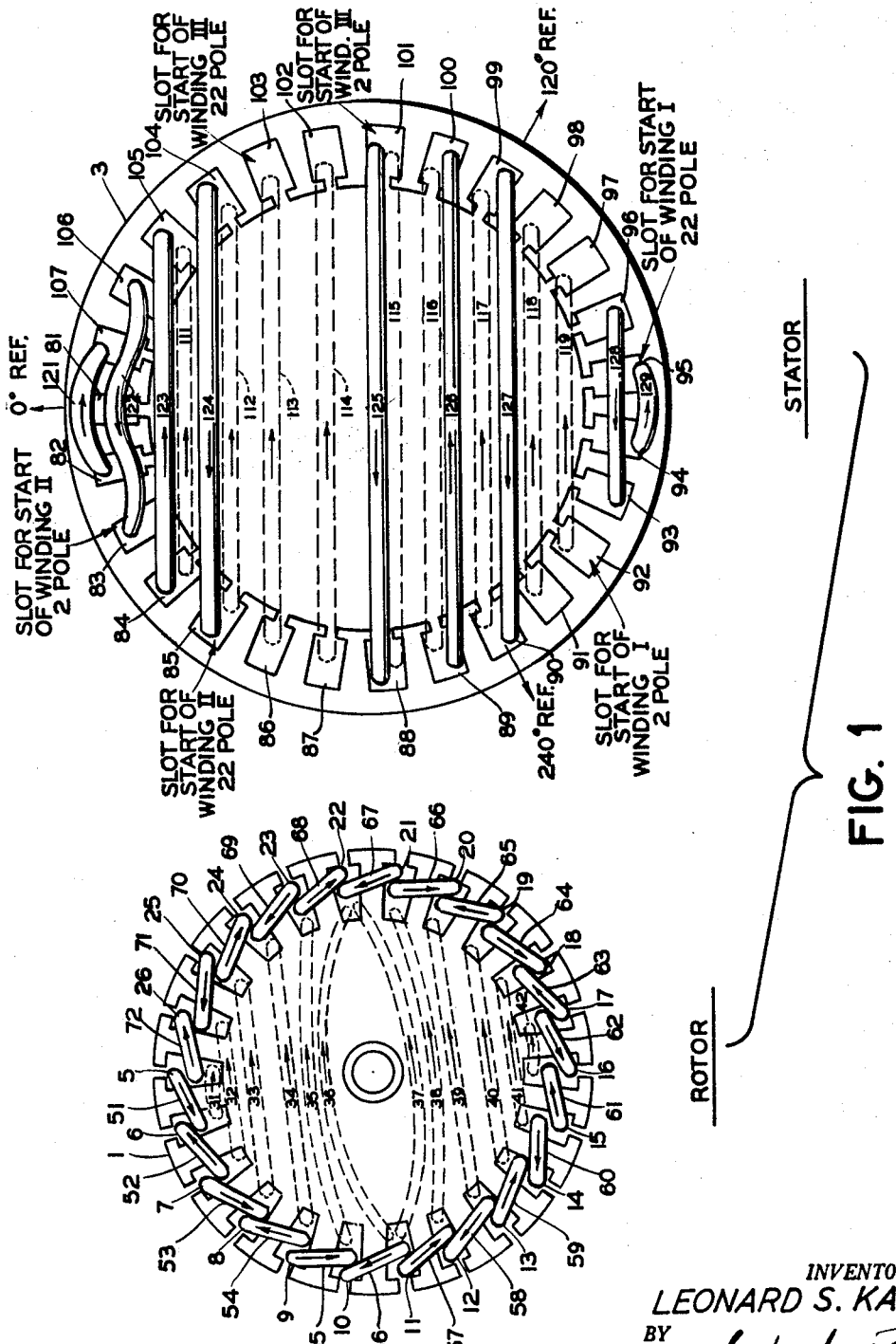
FIGURE 1 is an exploded view of a two-speed synchro embodying the invention and having a twenty-two slot rotor and a twenty-seven slot stator. The multi-pole windings on the rotor and stator are shown in solid lines and the two-pole windings are shown in dash lines.
Figure 2:
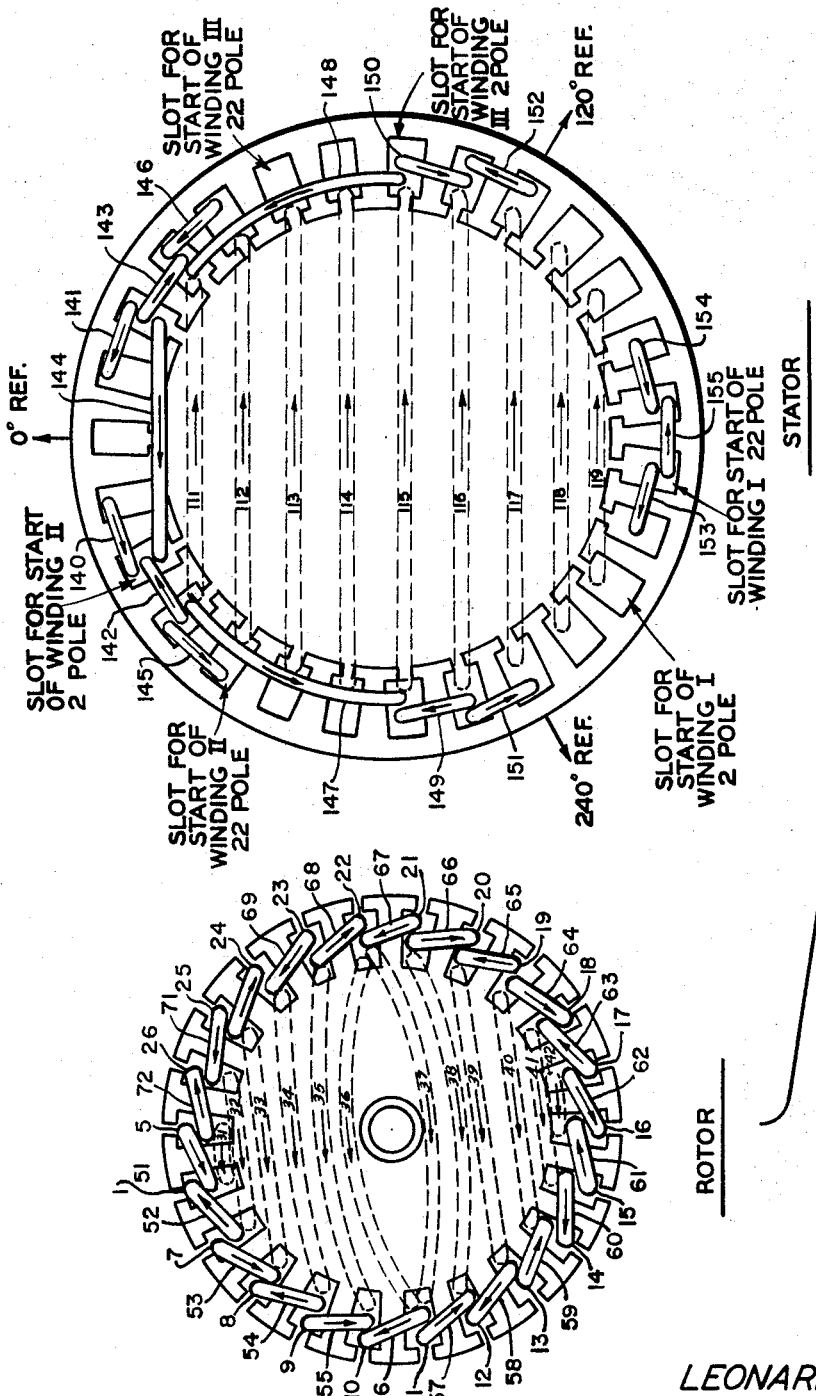
FIGURE 2 is a view similar to FIGURE 1 embodying the invention and with the windings modified to simplify manufacture.

The novel electrical two-speed synchro shown in the drawings and constructed according to the invention has a rotor 1 mounted for rotation in a conventional manner in a stator 3. The rotor and stator are inductively coupled to one another. FIGURES 1 and 2 are exploded views so that the winding configurations on the rotor and stator may be shown more clearly.

In the embodiment shown, the rotor is wound to provide two-pole and twenty-two pole magnetic flux, and the rotor has twenty-two slots 5 to 26 in which the two-pole coils 31 to 42 shown in dash lines, and the twenty-two pole coils 51 to 72 shown in solid lines, are distributed. Instantaneous alternating current flow through the coils is indicated by the arrows. It will be observed that current flow through all the two-pole coils 31 to 42 is in the same direction, that is, in phase, and that current flow through twenty-two pole coils 51 to 72 is alternately in opposite directions, that is, in opposite phases.

As indicated above, coils 31 to 42 provide two magnetic poles and coils 51 to 72 provide twenty-two magnetic poles of alternately opposite phases. The two-pole windings are distributed on the rotor and the number of turns in each coil is determined in accordance with the teachings of Glass Patent No. 2,488,771, issued November 22, 1949, and assigned to the same assignee as the present applications.

The distribution of the coils of the two-pole winding in the rotor slots expressed in percent of the total number of turns per winding is given below:

Coil No.:
$31 = N_1 = 2.0255\%$
$42 = N_1 = 2.0255\%$
$32 = N_3 = 5.913\%$
$41 = N_3 = 5.913\%$
$33 = N_5 = 9.3205\%$
$40 = N_5 = 9.3205\%$
$34 = N_7 = 11.971\%$
$39 = N_7 = 11.971\%$
$35 = N_9 = 13.6545\%$
$38 = N_9 = 13.6545\%$
$36 = N_{11} = 7.1155\%$
$37 = N_{11} = 7.1155\%$ where N is the number of turns per winding in the coils identified by a subscript using the number of teeth between the slots in the shorter path.

The twenty-two poles coils 51 to 72 all have an equal number of turns and are connected in series so that instantaneous current flows through alternate coils in opposite directions, that is, in opposite phases, as indicated by the arrows.

In the embodiment shown, stator 3 has twenty-seven slots 81 to 107 skewed to provide uniform permeability around its periphery and in which are distributed in accordance with the teachings of Glass Patent No. 2,488,771 coils 111 to 119, shown in dash lines, which cooperate with two-pole rotor coils 31 to 42, and coils 121 to 129, shown in solid lines, which cooperate with twenty-two pole rotor coils 51 to 72. The distribution of coils 111 to 119 and of coils 121 to 129 expressed in percent of the total number of turns per winding is given below:

| Coil No. | 2-Pole (dash line coils) | Coil No. | 22-Pole (solid line coils) |
| --- | --- | --- | --- |
| 111 | $N_6 + 4.039\%$ | 121 | $N_2 + 1.352\%$ |
| 112 | $N_8 + 9.221\%$ | 122 | $N_4 - 13.889\%$ |
| 113 | $N_{10} + 13.889\%$ | 123 | $N_6 + 17.817\%$ |
| 114 | $N_{12} + 17.817\%$ | 124 | $N_8 - 6.670\%$ |
| 115 | $N_{13} + 19.432\%$ | 125 | $N_{13} - 9.221\%$ |
| 116 | $N_{11} + 15.961\%$ | 126 | $N_{11} + 19.432\%$ |
| 117 | $N_9 + 11.629\%$ | 127 | $N_9 + 11.629\%$ |
| 118 | $N_7 + 6.670\%$ | 128 | $N_8 - 4.039\%$ |
| 119 | $N_5 + 1.352\%$ | 129 | $N_1 + 15.961\%$ | where N is the number of turns per winding in the coils identified by a subscript using the number of teeth between the slots in the shorter path.

The coils shown in FIGURE 1 are for a single winding only and the invention contemplates the use of two additional windings displaced 120° and 240° from the winding shown, as indicated in FIGURE 1. The three windings preferably are connected in Y configuration. The number of turns and the distribution of the coils otherwise is the same as the windings shown.

The two-pole winding of rotor 1 comprising coils 31 to 42, shown in dash lines, is energized by an alternating current voltage and cooperates with coils 111 to 119 of the stator, shown in dash lines. The alternating two-pole magnetic field in the rotor induces an alternating current in the stator winding which changes sinusoidally in accordance with the following equation upon relative rotation of the rotor and stator and goes through one complete cycle when the rotor rotates 360° relative to the stator as shown by curve A in FIGURE 3:

$$E = K_1 E_{in} \sin(2\pi ft + A_1) \sin B$$

Figure 3:
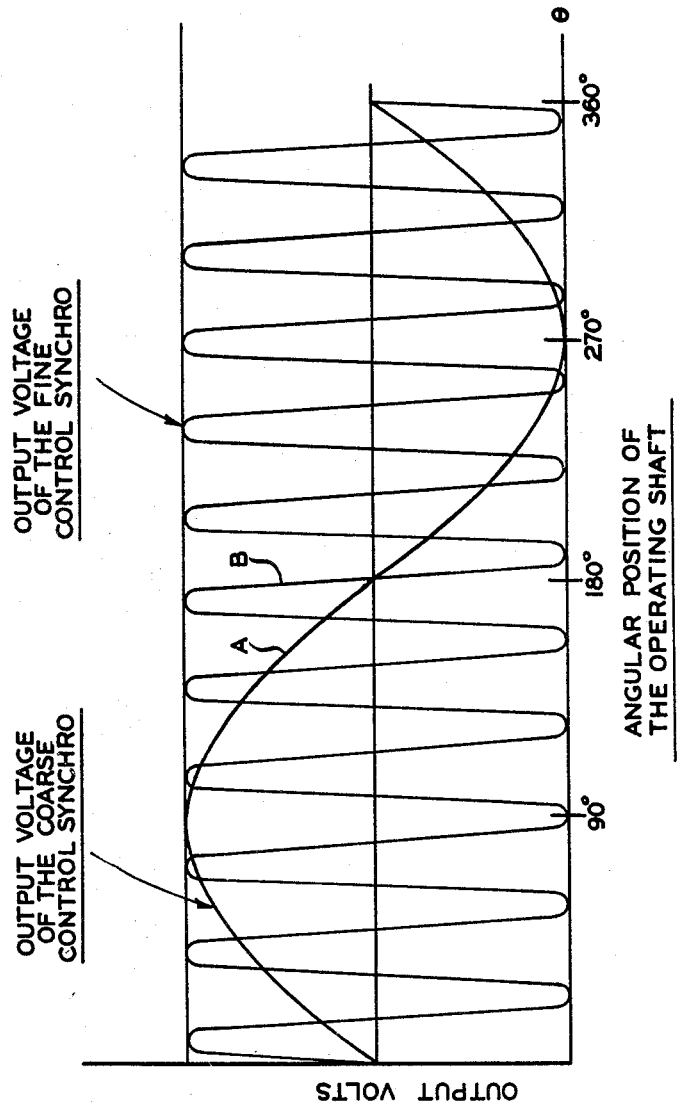
FIGURE 3 shows the output voltages produced by the two-speed synchro.

The twenty-two pole winding of the rotor comprising coils 51 to 72, shown in solid lines, likewise is energized by an alternating current voltage and the resulting alternating twenty-two pole magnetic field induces an alternating current voltage in coils 121 to 129 of the stator which varies sinusoidally in accordance with the following equation upon relative rotation of the rotor and stator and goes through eleven cycles upon 360° rotation of the rotor relative to the stator as shown by curve B in FIGURE 3:

$$E = K_2 E_{in} \sin(2\pi ft + A_2) \sin 11B$$

In the above equations:

$E_{in}$ represents the input voltage
$K_1$ and $K_2$ represent the ratio of the maximum secondary voltage to the input voltage
$f$ represents excitation frequency
$t$ represents time
$A_1$ and $A_2$ represent the time phase shift of secondary voltage with respect to input voltage $E_{in}$ and
$B$ represents rotor position.

Therefore, upon relative rotation of the rotor and stator through an angle of 360°, the voltage induced in coils 111 to 119 of the stator varies sinusoidally and goes through one cycle and the voltage induced in coils 121 to 129 of the stator varies sinusoidally and goes through eleven cycles. The voltages induced in the other two windings of the single-cycle section are space displaced 120° and 240° from the voltage shown and are as follows:

$$E_{120°} = K_1 E_{in} \sin(2\pi ft + A_1) \sin(B + 120°)$$
$$E_{240°} = K_1 E_{in} \sin(2\pi ft + A_1) \sin(B + 240°)$$

The voltage induced in the other two windings of the eleven-cycle section are also space displaced 120° and 240° and are as follows:

$$E_{120°} = K_2 E_{in} \sin(2\pi ft + A_2) \sin(11B + 120°)$$
$$E_{240°} = K_2 E_{in} \sin(2\pi ft + A_2) \sin(11B + 240°)$$

While applicant's invention has been incorporated in a synchro having a rotor with twenty-two slots and a stator with twenty-seven slots with windings distributed to provide an eleven-cycle output in the multi-cycle section, it should be understood that any other convenient arrangement of slots, winding distribution and multi-cycle output may be used also. The general voltage equations for such a multi-cycle arrangement are as follows:

$$E = K_2 E_{in} \sin(2\pi ft + A_2) \sin \frac{n}{4} B$$

$$E\phi_1 = K_2 E_{in} \sin(2\pi ft + A_2) \sin\left(\frac{n}{4} B + \phi_1\right)$$

$$E\phi_2 = K_2 E_{in} \sin(2\pi ft + A_2) \sin\left(\frac{n}{4} B + \phi_2\right)$$

where $n$ is a multiple of 4, greater than 4 and $\phi_1$ and $\phi_2$ are the angular displacements between the several windings. Of course, it should be understood that any number of windings may be used and the invention is not limited to three.

ELEVEN-CYCLE SECTION

Excitation of coils 51 to 72 of the rotor produces twenty-two poles of flux of alternately opposite phases, of uniform density, and of magnitude $\Phi_{max}$. The general equation of flux distribution in each pole is the same as the equation of the harmonics which make up a square wave. This equation is as follows:

$$\Phi f(\theta) = \Phi_{max}$$
$$(K_1 \cos \theta - K_3 \cos 3\theta + K_5 \cos 5\theta - K_7 \cos 7\theta + K_9 \cos 9\theta \text{ etc.})$$

where $K_1$, $K_3$, $K_5$, $K_7$ and $K_9$ etc. represent the proportion of $\Phi_{max}$ for the various harmonics, and $\theta$ is the angle subtended by two poles of flux.

The equation of flux distribution for the eleven-cycle flux of twenty-two poles requires that each angle $\theta$ be multiplied by eleven and is as follows:

$$\Phi f(11\theta) = \Phi_{max}$$
$$(K_{11} \cos 11\theta - K_{33} \cos 33\theta + K_{55} \cos 55\theta - K_{77} \cos 77\theta + K_{99} \cos 99\theta \text{ etc.})$$

where $K_{11}$, $K_{44}$, $K_{55}$, $K_{77}$ etc. represent the proportion of $\Phi_{max}$ for the various harmonics.

With a twenty-seven slot stator, as shown in the drawings, there are a possible thirteen coils for use with thirteen possible pitch factors. The pitch factors for the fundamental (KP) and the pitch factors in terms of any harmonic (KPX) for the thirteen coils are as follows:

| Coil | KP | KPX |
| --- | --- | --- |
| $N_2$ | Sin 40/3 | Sin 40/3$X$ |
| $N_4$ | Sin 80/3 | Sin 80/3$X$ |
| $N_6$ | Sin 120/3 | Sin 120/3$X$ |
| $N_8$ | Sin 160/3 | Sin 160/3$X$ |
| $N_{10}$ | Sin 200/3 | Sin 200/3$X$ |
| $N_{12}$ | Sin 240/3 | Sin 240/3$X$ |
| $N_{13}$ | Sin 280/3 | Sin 280/3$X$ |
| $N_{11}$ | Sin 320/3 | Sin 320/3$X$ |
| $N_9$ | Sin 360/3 | Sin 360/3$X$ |
| $N_7$ | Sin 400/3 | Sin 400/3$X$ |
| $N_5$ | Sin 440/3 | Sin 440/3$X$ |
| $N_3$ | Sin 480/3 | Sin 480/3$X$ |
| $N_1$ | Sin 520/3 | Sin 520/3$X$ | where X is the harmonic under consideration and N is the number of turns per winding in the coils identified by a subscript using the number of teeth between the slots in the shorter path.

The voltage induced in any coil due to any harmonic flux is as follows:

$$\epsilon(X, N) = \Phi_{max} K_x \cos X\theta N_n KPX$$

where $\epsilon(X, N)$ = the voltage induced in any coil N due to flux harmonic X.
$\Phi_{max} K_x \cos X\theta$ = flux harmonic under consideration
$N_n$ = coil under consideration
$KPX$ = pitch factor for coil $N_n$ due to flux harmonic (X).

The voltage induced in a winding due to any flux harmonic is the summation of the voltages induced in the individual coils due to the flux harmonic. The voltage induced in any winding due to any flux harmonic (X) is as follows:

$$\epsilon(x) = \Phi_{max} K_x \cos X\theta$$
$$\left[ N_2 \sin \frac{40}{3}X + N_4 \sin \frac{80}{3}X + N_6 \sin \frac{120}{3}X \right.$$
$$\left. + N_8 \sin \frac{160}{3}X \cdots + N_3 \sin \frac{480}{3}X + N_1 \sin \frac{520}{3}X \right]$$

where $\epsilon(x)$ = the voltage induced due to flux harmonic (X)
$\Phi_{max} K_x \cos X\theta$ = magnitude of flux harmonic (X)

$$\left[ N_2 \sin \frac{40}{3}X + \cdots N_1 \sin \frac{520}{3}X \right]$$

= summation of the product of turns N per coil times pitch factor of all the coils that comprise the winding.

A series of equations can be written for the voltages induced in a winding due to the flux harmonics $\Phi f(11\theta)$ generated in the rotor in terms of the turns and pitch factors for the coils that make up the winding. These voltage equations in condensed form are as follows:

$$\epsilon_{11} = \Phi_{max} K_{11} \cos 11\theta \left[ N_2 \sin \frac{40}{3} X11 \ldots \right.$$
$$\left. N_{13} \sin \frac{280}{3} X11 \ldots + N_1 \sin \frac{520}{3} X11 \right]$$

$$\epsilon_{33} = \Phi_{max} K_{33} \cos 33\theta \left[ N_2 \sin \frac{40}{3} X33 \ldots \right.$$
$$\left. N_{13} \sin \frac{280}{3} X33 \ldots + N_1 \sin \frac{520}{3} X33 \right]$$

$$\epsilon_{55} = \Phi_{max} K_{55} \cos 55\theta \left[ N_2 \sin \frac{40}{3} X55 \ldots \right.$$
$$\left. N_{13} \sin \frac{280}{3} X55 \ldots + N_1 \sin \frac{520}{3} X55 \right]$$

$$\epsilon_{77} = \Phi_{max} K_{77} \cos 77\theta \left[ N_2 \sin \frac{40}{3} X77 \ldots \right.$$
$$\left. N_{13} \sin \frac{280}{3} X77 \ldots + N_1 \sin \frac{520}{3} X77 \right]$$

$$\epsilon_{99} = \Phi_{max} K_{99} \cos 99\theta \left[ N_2 \sin \frac{40}{3} X99 \ldots \right.$$
$$\left. N_{13} \sin \frac{280}{3} X99 \ldots + N_1 \sin \frac{520}{3} X99 \right]$$

etc.

Since voltage harmonics of the order greater than 27 are repetitions of the harmonics of the order of 1 through 27, the only voltage harmonics of concern are the following: $\epsilon_{11}$, $\epsilon_{33}$, $\epsilon_{55}$, $\epsilon_{77}$, $\epsilon_{99}$, $\epsilon_{121}$, $\epsilon_{143}$, $\epsilon_{165}$, $\epsilon_{187}$, $\epsilon_{209}$, $\epsilon_{231}$, $\epsilon_{253}$, $\epsilon_{275}$, and $\epsilon_{297}$. Thus we have 13 voltage equations $\epsilon_{11}$, $\epsilon_{33}$ etc. with thirteen unknowns $N_1$, $N_2$, $N_3$, $N_4$, $N_5$, $N_6$, $N_7$, $N_8$, $N_9$, $N_{10}$, $N_{11}$, $N_{12}$ and $N_{13}$. With thirteen voltage equations and thirteen unknowns, the elimination of the harmonic voltages greater than the fundamental can readily be attained by setting the harmonic voltages, other than the fundamental, equal to zero and solving for the thirteen unknowns $N_1$, $N_2$, $N_3$ etc.

When the windings are displaced 120° from one another and are Y-connected, third voltage harmonics are elminated and therefore there is no need for equating equations for $\epsilon_{33}$, $\epsilon_{99}$, $\epsilon_{165}$, $\epsilon_{231}$, to zero thus reducing the voltage equations to nine [$\epsilon_{11}$, $\epsilon_{55}$, $\epsilon_{77}$, $\epsilon_{121}$, $\epsilon_{143}$, $\epsilon_{187}$, $\epsilon_{209}$, $\epsilon_{253}$, $\epsilon_{275}$]. The number of coils also can be reduced to nine.

The nine coils having the largest pitch factors for the fundamental voltage are selected because they are the most efficient as to the number of turns required to produce a given output voltage, thus saving the amount of copper required. The nine coils with the largest pitch factors for the fundamental are the following:

$$N_2, N_4, N_6, N_8, N_{13}, N_{11}, N_9, N_3, N_1$$

The nine voltage equations and nine unknowns N may be solved simultaneously by equating all harmonic voltages equal to zero, with the exception of the fundamental. Thus, $$\epsilon_{11} = 1$$

and $$\epsilon_{55} = \epsilon_{77} = \epsilon_{121} = \epsilon_{193} = \epsilon_{187} = \epsilon_{209} = \epsilon_{253} = \epsilon_{275} = 0$$

and $N_2$, $N_4$, $N_6$, etc. are solved in terms of percent of total turns ($N_T$) where $$N_T = N_2 + N_4 + N_6 + N_8 + N_{13} + N_{11} + N_9 + N_3 + N_1$$

The pitch factors KPX of the various coils for the 9 harmonic voltages are listed below:

This coil distribution eliminates all harmonics except the slot harmonics $22X \pm 1$ where $X = 1, 2, 3, 4, 5$ etc.

*Table I*

| Harmonic | Pitch Factors KPX | | | | | | | | |
|---|---|---|---|---|---|---|---|---|---|
| | $N_2$ | $N_4$ | $N_6$ | $N_8$ | $N_{13}$ | $N_{11}$ | $N_9$ | $N_3$ | $N_1$ |
| $11\theta$ | Sin 440/3 | −Sin 200/3 | Sin 240/3 | −Sin 400/3 | −Sin 160/3 | Sin 280/3 | −Sin 360/3 | −Sin 120/3 | Sin 320/3 |
| $55\theta$ | Sin 40/3 | Sin 80/3 | Sin 120/3 | Sin 160/3 | Sin 280/3 | Sin 320/3 | Sin 480/3 | Sin 480/3 | Sin 520/3 |
| $77\theta$ | −Sin 160/3 | −Sin 320/3 | −Sin 480/3 | Sin 440/3 | −Sin 40/3 | −Sin 200/3 | −Sin 360/3 | Sin 240/3 | Sin 80/3 |
| $121\theta$ | Sin 520/3 | −Sin 40/3 | Sin 480/3 | −Sin 80/3 | Sin 400/3 | −Sin 160/3 | Sin 360/3 | −Sin 240/3 | Sin 280/3 |
| $143\theta$ | Sin 320/3 | −Sin 440/3 | −Sin 120/3 | Sin 200/3 | Sin 80/3 | Sin 400/3 | −Sin 360/3 | −Sin 480/3 | −Sin 160/3 |
| $187\theta$ | −Sin 80/3 | −Sin 160/3 | −Sin 240/3 | −Sin 320/3 | Sin 520/3 | Sin 440/3 | Sin 360/3 | Sin 120/3 | Sin 40/3 |
| $209\theta$ | −Sin 280/3 | Sin 520/3 | Sin 240/3 | −Sin 40/3 | Sin 200/3 | −Sin 80/3 | −Sin 360/3 | −Sin 120/3 | −Sin 400/3 |
| $253\theta$ | Sin 400/3 | −Sin 280/3 | Sin 120/3 | Sin 520/3 | −Sin 440/3 | −Sin 40/3 | Sin 360/3 | Sin 480/3 | −Sin 200/3 |
| $275\theta$ | Sin 200/3 | Sin 400/3 | −Sin 480/3 | −Sin 280/3 | Sin 320/3 | Sin 520/3 | −Sin 360/3 | Sin 240/3 | Sin 440/3 |
| Percent $N_T$ | 1.352 | −13.889 | 17.817 | −6.670 | −9.221 | 19.432 | −11.629 | −4.039 | 15.961 |

The significance of the minus percent $N_T$ in the last line of the preceding table indicates that the coil is inserted in a direction opposite to the direction of the coils having a positive sign. In this way, all harmonics of the fundamental are eliminated except for those harmonics which have the same pitch factors as the fundamental, that is, the slot harmonics $N = X27 \pm 1$ where $X = 2, 4, 6, 8$ etc. These harmonics can be reduced or eliminated by skewing the slots in a conventional manner. Because of the high order of the slot harmonics and the ratio 11 to 1 of electrical error with respect to mechanical movement, very accurate mechanical positioning is possible using conventional synchro techniques. In transmitting shaft position, care must be exercised that correct servoed shaft position is selected out of the eleven possible choices. For this reason, a single-cycle element is required to avoid ambiguity.

SINGLE-CYCLE SECTION

The single-cycle rotor windings comprise twelve concentric coils 31 to 42 connected in series and distributed in accordance with the teachings of Glass Patent No. 2,488,771. The coil distribution in percent of turns is as follows:

Coil No.:
$31 = N_1 = 2.0255\% \ N_T$
$42 = N_1 = 2.0255\% \ N_T$
$32 = N_3 = 5.913\% \ N_T$
$41 = N_3 = 5.913\% \ N_T$
$33 = N_5 = 9.3205\% \ N_T$
$40 = N_5 = 9.3205\% \ N_T$
$34 = N_7 = 11.971\% \ N_T$
$39 = N_7 = 11.971\% \ N_T$
$35 = N_9 = 13.6545\% \ N_T$
$38 = N_9 = 13.6545\% \ N_T$
$36 = N_{11} = 7.1155\% \ N_T$
$37 = N_{11} = 7.1155\% \ N_T$ where $N_T = (N_1 + N_3 + N_5 + N_7 + N_9 + 2N_{11} + N_9 + N_7 + N_5 + N_3 + N_1) = 100\%$ The flux distribution for the single-cycle rotor is as follows:

$$\Phi f(\theta) = \Phi_{max} (K_1 \cos \theta + K_{21} \cos 21\theta + K_{23} \cos 23\theta + K_{43} \cos 43\theta + K_{45} \cos 45\theta \text{ etc.})$$

where $K_1$, $K_{21}$, $K_{23}$, $K_{43}$, $K_{45}$ etc. represent the proportion of $\Phi_{max}$ for various harmonics.

Following the same technique as outlined in the eleven-cycle section, voltage harmonic equations can be reduced to nine equations for $\epsilon_1$, $\epsilon_5$, $\epsilon_7$, $\epsilon_{11}$, $\epsilon_{13}$, $\epsilon_{17}$, $\epsilon_{19}$, $\epsilon_{23}$, $\epsilon_{25}$, with nine unknowns $N_6$, $N_8$, $N_{10}$, $N_{12}$, $N_{12}$, $N_{11}$, $N_9$, $N_7$ and $N_5$. For the single-cycle section, the above-mentioned coils $N_6$, $N_8$ etc. represent the coils having the largest pitch factors for the fundamental voltage equations. With nine equations and nine unknowns, the voltage harmonics can be equated to zero and the turn distribution for the nine unknowns ($N_6$, $N_8$ etc.) determined. The pitch factors for the various coils ($N_6$, $N_8$, $N_{10}$ etc.) for the various voltage harmonics ($\epsilon_1$, $\epsilon_5$, $\epsilon_7$, etc.) are listed in the following table. The turn distribution in terms of total turns $N_T$ is also included.

*Table II*

| Harmonic | $N_6$ | $N_8$ | $N_{10}$ | $N_{12}$ | $N_{13}$ | $N_{11}$ | $N_9$ | $N_7$ | $N_5$ |
|---|---|---|---|---|---|---|---|---|---|
| $1\theta$ | Sin 120/3 | Sin 160/3 | Sin 200/3 | Sin 240/3 | Sin 280/3 | Sin 320/3 | Sin 360/3 | Sin 400/3 | Sin 440/3 |
| $5\theta$ | −Sin 480/3 | −Sin 280/3 | −Sin 80/3 | Sin 120/3 | Sin 320/3 | Sin 520/3 | −Sin 360/3 | −Sin 160/3 | Sin 40/3 |
| $7\theta$ | −Sin 240/3 | Sin 40/3 | Sin 320/3 | −Sin 480/3 | −Sin 200/3 | Sin 80/3 | Sin 360/3 | −Sin 440/3 | −Sin 160/3 |
| $11\theta$ | Sin 240/3 | −Sin 400/3 | Sin 40/3 | Sin 480/3 | −Sin 160/3 | Sin 280/3 | −Sin 360/3 | Sin 40/3 | Sin 520/3 |
| $13\theta$ | Sin 480/3 | −Sin 80/3 | Sin 440/3 | −Sin 120/3 | Sin 400/3 | −Sin 160/3 | Sin 360/3 | −Sin 200/3 | Sin 320/3 |
| $17\theta$ | −Sin 120/3 | −Sin 520/3 | −Sin 240/3 | −Sin 240/3 | Sin 440/3 | Sin 40/3 | −Sin 360/3 | Sin 320/3 | −Sin 80/3 |
| $19\theta$ | Sin 120/3 | −Sin 200/3 | −Sin 520/3 | Sin 240/3 | −Sin 80/3 | −Sin 400/3 | Sin 360/3 | Sin 40/3 | −Sin 280/3 |
| $23\theta$ | −Sin 480/3 | Sin 440/3 | Sin 280/3 | Sin 120/3 | −Sin 40/3 | −Sin 200/3 | −Sin 360/3 | −Sin 520/3 | Sin 40/3 |
| $25\theta$ | −Sin 240/3 | −Sin 320/3 | −Sin 400/3 | −Sin 480/3 | Sin 520/3 | Sin 440/3 | Sin 360/3 | Sin 280/3 | Sin 200/3 |
| Percent $N_T$ | 4.039 | 9.221 | 13.889 | 17.817 | 19.432 | 15.961 | 11.629 | 6.670 | 1.352 |

The single-cycle stator winding eliminates all flux harmonics generated in the rotor except the slot harmonics $27X \pm 1$ where $X = 1, 2, 3, 4, 5$ etc.

Since the pitch factors are identical for the coils of both the single-cycle and eleven-cycle sections, the simultaneous solution of the equations for the single-cycle section are the same as for the eleven-cycle section. The percentage of the total number of turns per winding ($N_T$) is the same for the coils of both the eleven-cycle and the single-cycle sections for those coils which have the same pitch factors.

INTERACTION BETWEEN SINGLE-CYCLE AND ELEVEN-CYCLE SECTIONS

A comparison of the pitch factors for the eleven-cycle with the pitch factors for the single-cycle stator windings indicates that the pitch factors are exactly the same if considered as follows:

(a) The negative sign before the percentage of turns distribution for coils of the eleven-cycle winding indicates a reversal in direction of insertion or in current flow and applies to $N_4$, $N_8$, $N_{13}$, $N_9$, $N_3$.

(b) Taking into consideration the above-mentioned reversal in sign, the coils of the single-cycle section and the eleven-cycle section having the same pitch factors are as follows:

| Single-Cycle | Eleven-Cycle | Percent $N_T$ |
|---|---|---|
| $N_6$ | $N_3$ | 4.039 |
| $N_8$ | $N_{13}$ | 9.221 |
| $N_{10}$ | $N_4$ | 13.889 |
| $N_{12}$ | $N_6$ | 17.817 |
| $N_{13}$ | $N_{11}$ | 19.432 |
| $N_{11}$ | $N_1$ | 15.961 |
| $N_9$ | $N_9$ | 11.629 |
| $N_7$ | $N_8$ | 6.670 |
| $N_5$ | $N_2$ | 1.353 |

In the above it should be noted that the coils having the same pitch factors also have the same percent turns distribution. It is this fact that permits the generation of a single-cycle section and an eleven-cycle section on the same rotor and stator core. The single-cycle voltage and its harmonics are not generated in the eleven-cycle section because of the coil distribution and pitch factors of the eleven-cycle section. Likewise, the eleven-cycle voltage and its harmonics are not generated in the single-cycle section because of the coil distribution and pitch factors of the single-cycle section.

In actual practice, small interaction occurs between the eleven-cycle section and the single-cycle section resulting in an error of the order of a 54th harmonic resulting primarily from inability to skew the stator slots correctly for both the single-cycle and the eleven-cycle sections. The stator slots preferably are skewed to make the eleven-cycle section as accurate as possible in the two-speed synchro, since the eleven-cycle section is used for fine positioning and the single-cycle section is used for coarse positioning to prevent positional ambiguity.

To minimize interaction error between the single-cycle section and the eleven-cycle section, the single-cycle section is operated at as low a flux level as possible while the eleven-cycle section is operated at as high a flux level as the physical requirements of the synchros permit. This may be accomplished by using a lower voltage for exciting rotor coils 31 to 42 of the single-cycle section than is used for exciting rotor coils 51 to 72 of the eleven-cycle section or by winding design or a combination of the two.

The modification described above and required to minimize interaction between the two sections to insure fine accuracy of the eleven-cycle section is not required when separate rotors and stators are used.

In FIGURE 2 is shown a modification of the coil arrangement of FIGURE 1 to simplify manufacture, but with results comparable to those of FIGURE 1. The distribution of coils 31 to 42 and 51 to 72 in the rotor for the single-cycle and eleven-cycle sections, respectively, is the same as in FIGURE 1. Also, the distribution of the single-cycle coils 111 to 119 in the stator is the same as in FIGURE 1. The eleven-cycle coils 140 to 155 in the stator shown in solid lines in FIGURE 2 are distributed in a manner different from coils 121 to 129 in FIGURE 1.

The percent number of total turns N in coils 140 to 155 is calculated by determining the number of turns in the slots in which the coils are inserted and taking into account the relative direction of insertion or current flow through the coils. The percent number of total turns N in coils 140 to 155 is calculated as follows:

Coil No:
153, 154 $N_H = N_3 = -4.039$
155 $N_J = N_3 + N_1 = -4.039 + 15.961 = +11.922$
151, 152 $N_G = -N_9 = -(-11.629) = +11.629$
149, 150 $N_F = -(N_9 + N_{11}) = -(-11.629 + 19.432)$
$= -7.803$ Coil No:
147, 148 $N_E = -(N_9 + N_{11} + N_{13}) = -(-11.629 + 19.432 - 9.221) = +1.418$
145, 146 $N_D = -N_8 = -(-6.670) = +6.670$
142, 143 $N_B = -(N_6 + N_8 + N_9 + N_{11} + N_{13})$
$= -(17.817 - 6.670 - 11.629 + 19.432 - 9.221)$
$= -9.729$
140, 141 $N_A = N_2 = 1.352$
144 $N_C = -(N_6 + N_8 + N_9 + N_{11} + N_{13} + N_9 + N_2)$
$= -(-2.808) = +2.808$ where $N_A$ is the number of turns in coils 140 and 141
$N_B$ is the number of turns in coils 142 and 143
$N_C$ is the number of turns in coil 144
$N_D$ is the number of turns in coils 145 and 146
$N_E$ is the number of turns in coils 147 and 148
$N_F$ is the number of turns in coils 149 and 150
$N_G$ is the number of turns in coils 151 and 152
$N_H$ is the number of turns in coils 153 and 154
$N_J$ is the number of turns in coil 155
$N_2$ is the number of turns in coil 121
$N_4$ is the number of turns in coil 122
$N_6$ is the number of turns in coil 123
$N_8$ is the number of turns in coil 124
$N_{13}$ is the number of turns in coil 125
$N_{11}$ is the number of turns in coil 126
$N_9$ is the number of turns in coil 127
$N_3$ is the number of turns in coil 128
$N_1$ is the number of turns in coil 129

The minus sign indicates clockwise insertion of the coils in the slots and the plus sign indicates counterclockwise insertion of the coils in the slots.

Figure 4:
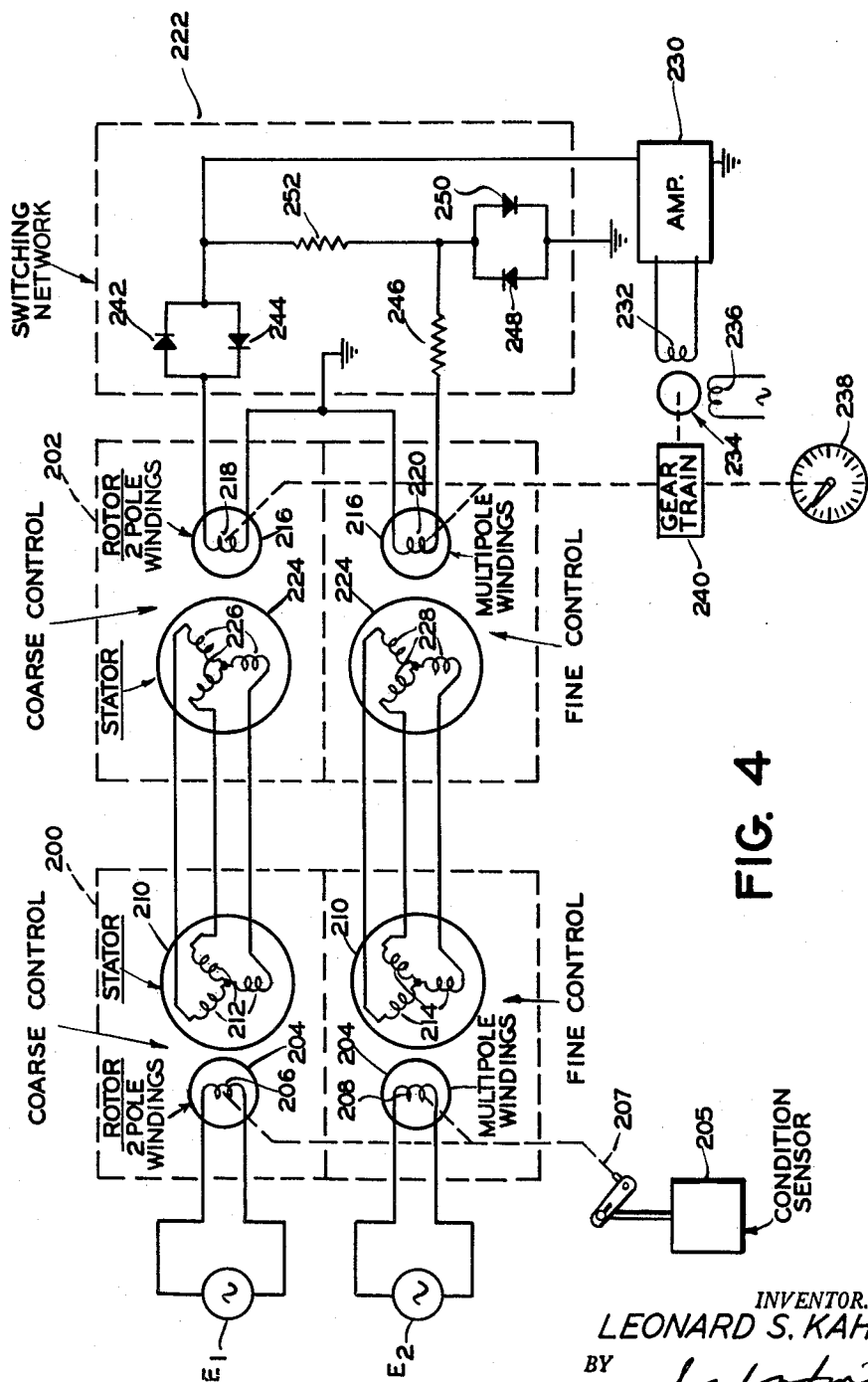
FIGURE 4 is a schematic wiring diagram of a data transmission system including two-speed synchros constructed according to the invention and used as a transmitter and control transformer.

FIGURE 4 shows a data transmission system including two-speed synchros constructed according to the invention, and comprising a transmitter 200 and a control transformer 202. Transmitter 200 has a rotor 204 which may be positioned in accordance with a change in condition by a condition sensor 205 through linkage 207. Rotor 204 has a two-pole winding 206 energized from a power source $E_1$ which may be a 15 volt 400 cycle source, and a multi-pole winding 208 energized from a power source $E_2$ which may be a 26 volt 400 cycle source. Transmitter 200 has a stator 210 with three single-cycle output windings 212 which cooperate with two-pole rotor winding 206, and three multi-cycle output windings 214 which cooperate with multi-pole rotor winding 208. Control transformer 202 is similar to transmitter 200 and comprises a rotor 216 with a two-pole winding 218 and a multi-pole winding 220 connected to a switching network 222 for the purpose described hereinafter. Control transformer includes a stator 224 having three single-cycle windings 226 connected back-to-back to stator windings 212, and three multi-cycle windings 228 connected back-to-back to stator windings 214. The single-cycle section of transmitter 200 and control transformer 202 provides coarse control and the multi-cycle section of transmitter 200 and control transformer 202 provides fine control.

Switching network 222 is connected to amplifier 230 which amplifies the signals from control transformer 202 and applies the amplified signals to the variable phase 232 of a servo control motor 234 having its fixed phase 236 connected to a power source. The servomotor is drivably connected to rotor 216 of control transformer 202 and, in the arrangement shown, to an indicator 238 through a gear train 240.

The switching network comprises a pair of diodes 242, 244 connected between two-pole winding 218 and amplifier 230 through a lead 245. Multi-pole winding 220 is connected through resistors 246, 252 and lead 245 to amplifier 230 and through resistor 246 and a pair of diodes 248, 250 to ground.

When a signal of relatively large amplitude appears across two-pole winding 218, the signal is applied through diodes 242, 244 and lead 245 to amplifier 230. During this time diodes 248, 250 are conductive and the signal from multi-pole winding 220 is shunted through resistor 246 and diodes 248, 250 to ground. As the signal from two-pole winding 218, 220 decreases in amplitude and approaches zero, diodes 242, 244 and 248, 250 become non-conducting and the signal from multi-pole winding 220 is applied to amplifier 230 through resistors 246, 252 and lead 245.

With the arrangement described, the two-pole section of the transmitter and control transformer control operation of motor 234 to move indicator 238 to approximate position, and then the multi-pole sections of the transmitter and control transformer control operation of the servomotor to more accurately position the indicator.

The novel two-speed synchro described herein maintains less than one minute error over an operating range of 360° during mechanical and thermal stresses induced by clamping, reasonable handling and environmental conditions encountered under missile and outer space rocket operating conditions. The sensitivity-to-noise ratio is such that the transmitter provides signals substantially free of harmonics and quadrature voltages for positioning the control transformer within the specified accuracy without the use of extensive auxiliary equipment for harmonic elimination and quadrature rejection. The novel two-speed synchro overcomes the inherent disadvantage of mechanical two-speed systems as used heretofore and operates with accuracies within thirty seconds of arc under dimensional stresses and wide temperature ranges.

While two embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

While the invention has been shown incorporated in a synchro with a twenty-two slot rotor and a twenty-seven slot stator using eleven poles in the multi-cycle section of the rotor, it should be understood that any convenient number of slots and poles can be used. Also, the invention contemplates the use of more than two slots per pole instead of two slots per pole as shown. While the invention has been described in a conventional synchro with three windings displaced by an angle of 120°, it should be understood that any number of windings can be used and they may be displaced by any suitable angle. For example, the invention may be used in a resolver which has two windings spaced by an angle of 90°.

The term synchro as used herein is intended to include inductive devices which have one or more windings energized by alternating current and displaced from one another by any suitable angle. The term synchro is intended to include resolvers which have two windings displaced from one another by 90 electrical degrees, and differentials which have three windings displaced from one another by 120 electrical degrees.

While the synchro shown herein has been described with the single-cycle and multi-cycle windings on the same rotor and stator magnetic cores, it should be understood that separate magnetic cores may be used for the single-cycle and multi-cycle windings to eliminate interaction between the single-cycle and multi-cycle sections, and the magnetic rotor cores may be rotated at the same speed.

What is claimed is:

1. A two-speed synchro having relatively movable inductively coupled rotor and stator elements, one of the elements having windings distributed to provide a two-pole alternating magnetic flux and a multi-pole alternating magnetic flux of alternately opposite phases, and the other element having windings distributed to provide a single-cycle output voltage and a multi-cycle output voltage upon relative rotation of the elements through a predetermined angle, the single cycle output windings being distributed to have minimum coupling with the multi-pole flux and the multi-cycle output windings being distributed to have minimum coupling with the two-pole flux.

2. A two-speed synchro having relatively movable inductively coupled rotor and stator elements, one of the elements having windings distributed to provide a two-pole magnetic flux and a multi-pole magnetic flux having $n/2$ poles where $n$ is a multiple of 4 greater than 4, and the other element having windings distributed to provide a single-cycle output voltage and an $n/4$ cycle output voltage upon relative rotation of the elements through a predetermined angle, the single cycle output windings being distributed to have minimum coupling with the multi-pole flux and the $n/4$ cycle output windings being distributed to have minimum coupling with the two-pole flux.

3. A two-speed synchro having relatively movable inductively coupled rotor and stator elements, one of the elements having windings distributed to provide a two-pole magnetic flux and a multi-pole magnetic flux having $n/2$ poles where $n$ is a multiple of 4 greater than 4, and the other element having three windings displaced from one another by an angle of 120° and each winding being distributed to provide a single cycle output voltage and an $n/4$ cycle output voltage upon relative rotation of the elements through a predetermined angle, the single cycle output windings being distributed to have minimum coupling with the multi-pole flux and the $n/4$ cycle output windings being distributed to have minimum coupling with the two-pole flux.

4. A two-speed synchro having relatively movable inductively coupled rotor and stator elements, windings on one of the elements adapted to be energized by a current source and distributed to provide a two-pole magnetic flux and a multi-pole magnetic flux having $n/2$ poles where $n$ is a multiple of 4 greater than 4, and windings on the other element distributed to provide a single cycle output voltage and an $n/4$ cycle output voltage upon relative rotation of the rotor and stator elements through a predetermined angle, the single cycle output windings being distributed to have minimum coupling with the multi-pole flux and the $n/4$ cycle output windings being distributed to have minimum coupling with the two-pole flux.

5. A two-speed synchro having relatively movable inductively coupled rotor and stator elements, windings on one of the elements adapted to be energized by a current source and distributed to provide a two-pole magnetic flux and a multi-pole magnetic flux having $n/2$ poles where $n$ is a multiple of 4 greater than 4, and three Y-connected windings on the other element displaced from one another by an angle of 120° and each winding being distributed to provide a single cycle output voltage and an $n/4$ cycle output voltage upon relative rotation of the rotor and stator elements through a predetermined angle, the single cycle output windings being distributed to have minimum coupling with the multi-pole flux and the $n/4$ cycle output windings being distributed to have minimum coupling with the two-pole flux.

6. A two-speed synchro having relatively movable inductively coupled rotor and stator elements, windings on one of the elements adapted to be energized by an alternating current source and distributed to provide a two-pole alternating magnetic flux and a multi-pole alternating magnetic flux of alternately opposite phases and having $n/2$ poles wherein $n$ is a multiple of 4 greater than 4, and windings on the other element distributed into coils to provide a single cycle output voltage and an $n/4$ cycle output voltage upon relative rotation of the rotor and stator elements through a predetermined angle, the single cycle output windings being distributed to have minimum coupling with the multi-pole flux and the $n/4$ cycle output windings being distributed to have minimum coupling with the two-pole flux.

7. A two-speed synchro having relatively movable inductively coupled rotor and stator elements, one of the elements having windings distributed to provide a two-pole magnetic flux and a multi-pole magnetic flux having $n/2$ poles where $n$ is a multiple of 4 and greater than 4, and the other element having windings distributed to provide outputs $E_1$ and $E_2$ in accordance with the following equations:

$$E_1 = K_1 E_{in} \sin(2\pi ft + A_1) \sin B$$

$$E_2 = K_2 E_{in} \sin(2\pi ft + A_2) \sin \frac{n}{4} B$$

where $E_{in}$ represents the input voltage
$K_1$ and $K_2$ represent the ratio of the maximum secondary voltage to the input voltage
$f$ represents excitation frequency
$t$ represents time
$A_1$ and $A_2$ represent the time phase shift of secondary voltage with respect to input voltage $E_{in}$, and
$B$ represents rotor position, the windings providing the output $E_1$ being distributed to have minimum coupling with the multi-pole magnetic flux and the windings providing the output $E_2$ being distributed to have minimum coupling with the two-pole magnetic flux.

8. A two-speed synchro having relatively movable inductively coupled rotor and stator elements, one of the elements having windings distributed to provide a two-pole magnetic flux and a multi-pole magnetic flux having $n/2$ poles where $n$ is a multiple of 4 greater than 4, and the other element having windings displaced from one another by an angle of $\phi$ and distributed to provide outputs $E$, $E\phi$ in accordance with the following equations:

$$E = K_1 E_{in} \sin(2\pi ft + A_1) \sin B$$

$$E\phi = K_1 E_{in} \sin(2\pi ft + A_1) \sin(B + \phi)$$

$$E = K_2 E_{in} \sin(2\pi ft + A_2) \sin \frac{n}{4} B$$

$$E\phi = K_2 E_{in} \sin(2\pi ft + A_2) \sin\left(\frac{n}{4} B + \phi\right)$$

where $E_{in}$ represents the input voltage
$K_1$ and $K_2$ represent the ratio of the maximum secondary voltage to the input voltage
$f$ represents excitation frequency
$t$ represents time
$A_1$ and $A_2$ represent the time phase shift of secondary voltage with respect to input voltage $E_{in}$, and
$B$ represents rotor position, the windings providing the outputs $E$ being distributed to have minimum coupling with the multi-pole magnetic flux and the windings providing the output $E_2$ being distributed to have minimum coupling with the two-pole magnetic flux.

9. A two-speed synchro having relatively movable inductively coupled rotor and stator elements, one of the elements having windings distributed to provide a two-pole alternating magnetic flux and a multi-pole alternating magnetic flux of alternately opposite phases, and the other element having twenty-seven slots with two sets of windings distributed in the slots into parallel or equivalent independent coils, one set of windings being distributed to have maximum coupling with the two-pole magnetic flux and minimum coupling with the twenty-two pole flux and the other set of windings being distributed to have maximum coupling with the twenty-two pole magnetic flux and minimum coupling with the two-pole magnetic flux, the turns in each coil of slot pitch indicated having the following respective percentage of the total number of turns in the winding:

| Coil slot pitch | Two-pole turns, percent of total per coil | Coil slot pitch | Twenty-two pole turns, percent of total per coil |
|---|---|---|---|
| 6 | 4.039 | 2 | 1.352 |
| 8 | 9.221 | 4 | 13.889 |
| 10 | 13.889 | 6 | 17.817 |
| 12 | 17.817 | 8 | 6.670 |
| 13 | 19.432 | 13 | 9.221 |
| 11 | 15.961 | 11 | 19.432 |
| 9 | 11.629 | 9 | 11.629 |
| 7 | 6.670 | 3 | 4.039 |
| 5 | 1.352 | 1 | 15.961 |

10. A two-speed synchro having relatively movable inductively coupled rotor and stator elements, windings on one of the elements distributed into coils to provide a two-pole magnetic flux and a multi-pole magnetic flux, means for maintaining the two-pole magnetic flux at a lower level than the multi-pole magnetic flux, and the other element having windings distributed to provide a single-cycle output voltage and a multi-cycle output voltage upon relative rotation of the elements through a predetermined angle, the single cycle output windings being distributed to have minimum coupling with the multipole flux and the multi-cycle output windings being distributed to have minimum coupling with the two-pole flux.

11. A multi-speed synchro having relatively movable inductively coupled rotor and stator elements, one of the elements having windings distributed to provide an $n$-pole alternating magnetic flux and an $m$-pole alternating magnetic flux where $n$ and $m$ are even integers, and the other element having windings distributed to provide an $n/2$ cycle output voltage and an $m/2$ cycle output voltage upon relative rotation of the elements through a predetermined angle, the $n/2$ cycle output windings being distributed to have minimum coupling with the $m$-pole flux and the $m/2$ cycle output windings being distributed to have minimum coupling with the $n$-pole flux.

References Cited by the Examiner

UNITED STATES PATENTS

| | | |
|---|---|---|
| 2,041,875 | 5/36 | Stoller. |
| 2,448,374 | 8/48 | Kent _____ 318—30 X |
| 2,488,771 | 11/49 | Glass _____ 318—24 |
| 2,590,845 | 4/52 | Curry _____ 318—24 X |
| 2,769,125 | 10/56 | Jacobi. |
| 2,823,363 | 2/58 | McKenney et al. _____ 336—120 |
| 2,885,645 | 5/59 | Wennerberg _____ 336—120 |
| 2,933,666 | 4/60 | Gordon. |

ORIS L. RADER, *Primary Examiner.*